(12) United States Patent
Pedoussaut et al.

(10) Patent No.: US 12,060,965 B2
(45) Date of Patent: Aug. 13, 2024

(54) OPTIMIZED CONNECTION ASSEMBLY BETWEEN TWO PORTIONS OF A SUPPLY LINE FOR A CRYOGENIC FLUID, INCLUDING AN ADDITIONAL THERMAL INSULATION CHAMBER AND A FLUID EXPANSION CHAMBER

(71) Applicants: Airbus SAS, Blagnac (FR); Airbus Operations SAS, Toulouse (FR)

(72) Inventors: Philippe Pedoussaut, Blagnac (FR); Najoua Erroui, Toulouse (FR); Hervé Tressol, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 17/973,644

(22) Filed: Oct. 26, 2022

(65) Prior Publication Data

US 2023/0139421 A1 May 4, 2023

(30) Foreign Application Priority Data

Oct. 28, 2021 (FR) ........................................ 2111497

(51) Int. Cl.
*F16L 59/18* (2006.01)
*F16L 51/03* (2006.01)

(52) U.S. Cl.
CPC .............. *F16L 59/184* (2013.01); *F16L 51/03* (2013.01); *F16L 2201/40* (2013.01)

(58) Field of Classification Search
CPC ........ F16L 39/005; F16L 59/184; F16L 51/03
See application file for complete search history.

(56) References Cited

U.S. PATENT DOCUMENTS 3,068,026 A * 12/1962 McKamey ............ F16L 39/005
62/50.7
3,146,005 A * 8/1964 Peyton .................. F16L 59/184
285/365

(Continued)

FOREIGN PATENT DOCUMENTS

CN  115370971 A * 11/2022 ............ F16L 39/005
EP    1128121 A1 * 8/2001 ............ F16L 39/005

(Continued)

OTHER PUBLICATIONS

French Search Report dated May 16, 2022; priority document.

*Primary Examiner* — Matthew Troutman
*Assistant Examiner* — Fannie C Kee
(74) *Attorney, Agent, or Firm* — Greer, Burns & Crain, Ltd.

(57) ABSTRACT

A connection assembly between two portions of a supply line for a cryogenic fluid, the assembly including a male nozzle arranged to be at least partially inserted into a female nozzle together forming a tight mechanical link, over a distance of a few centimeters, a thermal insulation chamber for each of the two line portions and an additional thermal insulation chamber to thermally insulate the connection zone of the two line portions, and an expansion chamber for the cryogenic fluid that is configured to be linked to a cryogenic fluid sensor, arranged about the connection zone of the two line portions. This enables two cryogenic fluid line portions to be connected without requiring one portion to be inserted into the other portion over a significant length, thereby enhancing mechanical flexibility and obviating the need for significant free space about the connection assembly to assemble and disassemble the assembly.

14 Claims, 5 Drawing Sheets

(56) References Cited

U.S. PATENT DOCUMENTS

| | | | | |
|---|---|---|---|---|
| 3,945,215 | A * | 3/1976 | Johnson | F16L 51/03 62/50.7 |
| 4,011,732 | A * | 3/1977 | Doherty | F16L 39/005 62/50.7 |
| 4,332,401 | A * | 6/1982 | Stephenson | F16L 59/184 285/47 |
| 4,491,347 | A | 1/1985 | Gustafson | |
| 7,942,452 | B2 * | 5/2011 | Carns | F16L 39/005 285/123.1 |
| 8,074,687 | B2 * | 12/2011 | Queau | F16L 39/005 62/50.7 |
| 8,308,200 | B1 * | 11/2012 | Barnes | F16L 39/005 285/123.1 |
| 2004/0134553 | A1 * | 7/2004 | Ichimura | F16L 39/005 138/112 |
| 2009/0102187 | A1 * | 4/2009 | Carns | F16L 39/005 285/123.15 |
| 2009/0145506 | A1 * | 6/2009 | Queau | F16L 39/005 138/108 |
| 2010/0024911 | A1 * | 2/2010 | Menardo | F16L 59/184 138/112 |
| 2012/0217739 | A1 * | 8/2012 | Weinhold | F16L 39/005 285/121.2 |

FOREIGN PATENT DOCUMENTS

| | | | | |
|---|---|---|---|---|
| FR | 2574524 | A1 | 6/1986 | |
| FR | 2694620 | A1 * | 2/1994 | F16L 51/03 |
| FR | 3119007 | A1 * | 7/2022 | F16L 39/005 |
| GB | 1567373 | A * | 5/1980 | F16L 59/184 |
| JP | H11153290 | A | 6/1999 | |
| WO | WO-2012048535 | A1 * | 4/2012 | F16L 39/005 |
| WO | WO-2014198915 | A1 * | 12/2014 | F16L 39/005 |
| WO | WO-2020090728 | A1 * | 5/2020 | F16L 39/005 |

* cited by examiner

OPTIMIZED CONNECTION ASSEMBLY BETWEEN TWO PORTIONS OF A SUPPLY LINE FOR A CRYOGENIC FLUID, INCLUDING AN ADDITIONAL THERMAL INSULATION CHAMBER AND A FLUID EXPANSION CHAMBER

CROSS-REFERENCES TO RELATED APPLICATIONS

This application claims the benefit of the French patent application No. 2111497 filed on Oct. 28, 2021, the entire disclosures of which are incorporated herein by way of reference.

FIELD OF THE INVENTION

The present invention relates to a connection assembly between two portions of a supply line for a cryogenic fluid. The invention notably concerns a connection assembly for a liquid hydrogen line in aircraft systems.

BACKGROUND OF THE INVENTION

Liquid hydrogen is a cryogenic fluid that can be used as a power source for generating electricity. It is, therefore, for example possible to use a hydrogen cell to power all of the communication and flight control systems of an aircraft, as well as the on-board lighting and the different accessories used on board the aircraft. Liquid hydrogen can also be used as a power source to propel an aircraft, by feeding a fuel cell or by direct combustion, which has the advantage of only discharging water into the atmosphere. The use of hydrogen requires distribution systems between one or more production or storage tanks and consumer devices. Thus, lines are conventionally used to carry the liquid hydrogen between a storage tank and a consumer device, such as a hydrogen cell. The lines used most commonly have an inner tube, through which the supplied fluid flows, and an outer wall that is separated from the inner tube by one or more thermal insulation chambers placed under a vacuum. Such lines, thermally insulated under vacuum, are pairs of concentric tubes in which the walls of the inner and outer tubes are kept apart from one another. In lines suitable to transport a cryogenic fluid for distribution, storage and/or another purpose, the thermal insulation between the inner tube and the outer wall enables both the fluid to be kept at a temperature suitable for distribution (for example, −253° C. in liquid form) and to prevent the formation of ice about the outer wall, which would be liable to generate mechanical stresses on neighboring elements in the distribution installation on account of the gradual increase in the volume of accumulated ice about the line.

Cryogenic fluid distribution lines often comprise a succession of flexible or rigid pipes that are thermally vacuum insulated and assembled together using suitable connection elements. This is notably the case for lines used to supply liquid oxygen, liquid nitrogen, liquid argon, liquid hydrogen, and liquid helium, for example. The fittings (connections) between the different flexible or rigid pipes that make up the line are connected together using pairs of connectors. Each pair of connectors includes a male connector arranged at the end of a pipe and configured to be inserted into a female connector arranged at the end of the neighboring pipe, and to form a tight sliding mechanical link. The seal is achieved simply by using a very-low-expansion material (coefficient of expansion) for the male connector and a material with significantly greater expansion for the female connector so that, when a cryogenic fluid flows through the line, the female connector contracts onto the male connector to make the tight mechanical link from a sliding link. The seal is reinforced by using one or more ring gaskets placed between the connected ends of two neighboring pipes. A ring gasket can, for example, be arranged between two adjacent flanges set back from the male nozzle and at the end of the female nozzle respectively, or between the end of the male nozzle and the bottom of the female nozzle. This type of joint between two neighboring pipes of a given line nonetheless requires the male connector (or male nozzle) to be inserted over a significant length in relation to the diameter of the line (up to several tens of centimeters) into the female connector (or female nozzle). For such a joint to be sealed, the female and male connectors also have to be coupled over a significant length, and be rigid. Such a configuration is not practical if a line, and more generally a fluid distribution system, needs to be installed in a restricted space, as is often the case on board an aircraft. Furthermore, a significant insertion length of the male nozzle in the female nozzle requires an equal space about the line to enable separation of two neighboring pipes during disassembly operations.

The situation can be improved.

SUMMARY OF THE INVENTION

One objective of the present invention is to propose connection means between two portions of a supply line for a cryogenic fluid that does not have at least some of the drawbacks of the existing solutions.

For this purpose, a connection assembly between two portions of a supply line for a cryogenic fluid is proposed, the connection assembly including a first line portion and a second line portion, the first line portion including a male nozzle arranged to be at least partially inserted into a female nozzle of the second line portion, the male and female nozzles together forming a tight sliding mechanical link, the first line portion being made of a first material with a coefficient of expansion lower than the coefficient of expansion of a second material used to make the second line portion, the first line portion including a first thermal insulation chamber and the second line portion including a second thermal insulation chamber, the connection assembly also including at least one additional thermal insulation chamber that is separate from each of the first and second thermal insulation chambers and that extends between the first and second thermal insulation chambers, and also includes an expansion chamber for the cryogenic fluid arranged about the contact surfaces between the first line portion and the second line portion, the expansion chamber being linked to a housing configured to receive or connect a presence sensor for the cryogenic fluid.

Advantageously, this provides connection means that are less bulky and more flexible between two line portions for supplying cryogenic fluid, such as liquid hydrogen, without the need for a significant amount of free space to enable the connection to be disassembled.

The connection assembly according to the invention may also include the following features, taken individually or in combination:

The maximum insertion distance of the male nozzle into the female nozzle is equal to or less than 50 mm, preferably equal to or less than 20 mm.

The fluid expansion chamber includes an element made of an absorbent material, preferably a spongy material.

At least one of the first line portion and the second line portion is generally cylindrical and has inner and outer walls with corrugations, the corrugations of the inner wall extending over a length of line with corrugations on the outer wall.

The first material is invar.

The second material is stainless steel.

A vacuum is created in each of the thermal insulation chambers.

The housing is a terminal volume of a duct linking the expansion chamber to the outside of the line.

The end of the outer wall of each of the line portions is flared to form a terminal contact flange that is configured to be positioned opposite the terminal contact flange of the other line portion of the two line portions, and in which the housing is arranged at the base of one of the two terminal flanges.

The invention also relates to a liquid hydrogen distribution system including a connection assembly as described above.

The invention also relates to an aircraft including a connection assembly between two line portions as mentioned above or a hydrogen distribution system including such an assembly.

BRIEF DESCRIPTION OF THE DRAWINGS

The aforementioned and other features of the present invention are set out more clearly in the description given below of an example embodiment, the description being provided with reference to the attached drawings, in which.

DETAILED DESCRIPTION OF THE PREFERRED EMBODIMENTS

Figure 1:
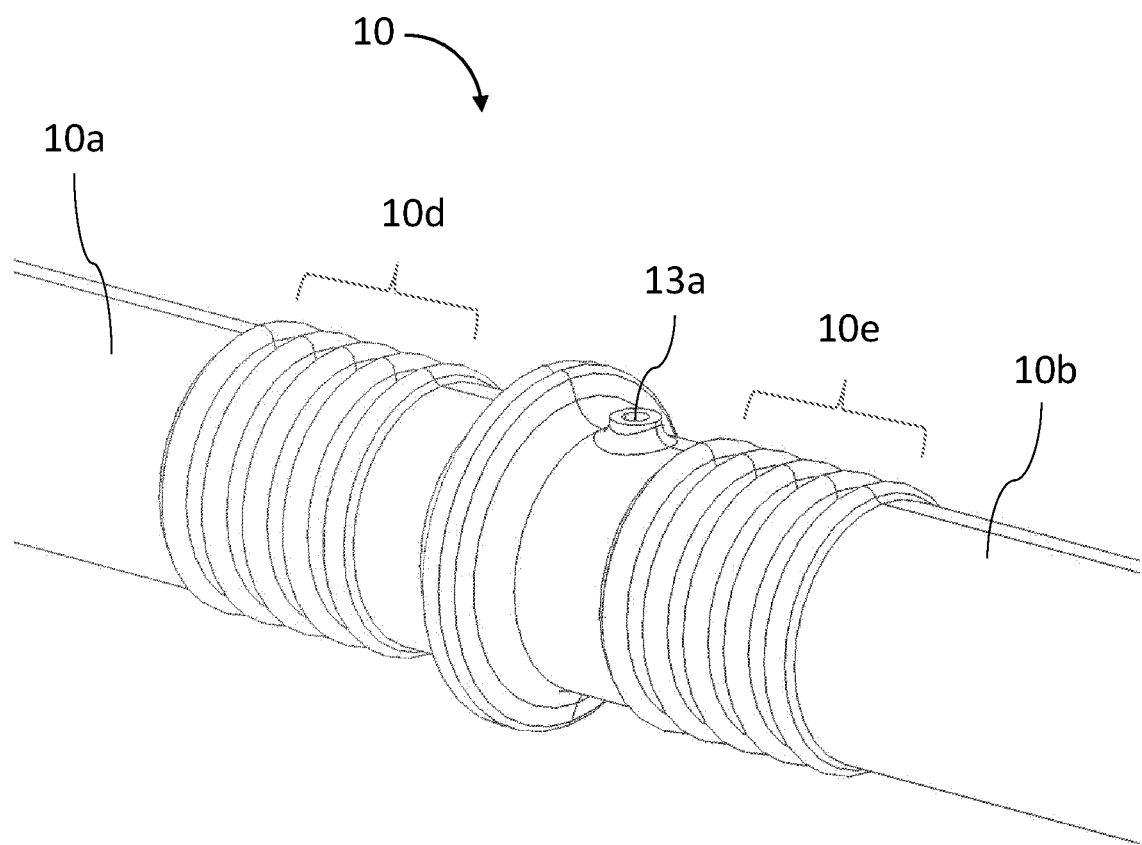
FIG. 1 is an overall perspective view of a connection between two joined portions of a line, according to one embodiment.

FIG. 1 is a schematic overview of a connection assembly 10 between a first portion 10a of a line and a second portion 10b of the same line, according to one embodiment. Each of the line portions 10a and 10b has an inner tube portion for a fluid flow and a thermal insulation chamber (not shown in FIG. 1).

According to one embodiment, the line shown is configured to supply a cryogenic fluid and has other line portions in addition to the portions 10a and 10b. In the example described, the line shown is configured to supply liquid hydrogen, and more specifically to distribute liquid hydrogen on board an aircraft. In the present description, the term "cryogenic fluid" refers to a liquefied gas kept at low temperatures, or to a gas obtained from such a liquid as a result of evaporation. Thus, for example, if the cryogenic fluid is hydrogen (or more specifically dihydrogen H2), the term cryogenic fluid refers to both the liquid hydrogen and the hydrogen gas, and the present invention therefore relates both to the liquid hydrogen and to the hydrogen gas when the cryogenic fluid is hydrogen.

The portions of the line other than the portions 10a and 10b are not shown here since the invention relates to a connection assembly between two neighboring portions of a single line that are connected together, and the description of just one of the connections between two neighboring portions of the line is required to understand the invention.

The term "connection" should be understood to be a synonym of sealed joint or link of two portions 10a and 10b of the liquid hydrogen distribution line.

According to one embodiment, the line portions 10a and 10b are tubular and comprise two concentric tubes kept apart from one another, for example by spacers positioned at regular intervals between the inner tube and the outer tubular wall of the line. More specifically, each of the line portions 10a and 10b has an inner fluid-supply tube surrounded by an annular thermal insulation chamber delimited by an outer wall with an overall tubular shape, the chamber including spacers for holding the inner tube in relation to the outer wall of the line. The line portion 10a therefore has a thermal insulation chamber 12a (not shown in FIG. 1) and the line portion 10b has a thermal insulation chamber 12b (not shown in FIG. 1). Corrugations 10d and 10e are respectively arranged on the outer wall of the portion 10a and of the portion 10b of the connection assembly 10 such as to make the connection assembly 10 flexible, along with corrugations in the inner tube that are positioned on the same lengths of line (shown in FIGS. 2 and 3). The resulting flexibility facilitates assembly and disassembly operations of the connection of two portions 10a and 10b of the connection assembly 10. A vacuum opening 13a enables a vacuum to be created in an additional thermal insulation chamber 13 (shown in FIG. 2) that is configured to provide thermal insulation for the connection assembly about the connection of the portions 10a and 10b. According to one embodiment, a vacuum is created in the additional thermal insulation chamber 13 and the thermal insulation chambers 12a and 12b of the line portions 10a and 10b using a vacuum pump connected to the vacuum opening of each of the chambers, after which the opening is closed.

Figure 2:
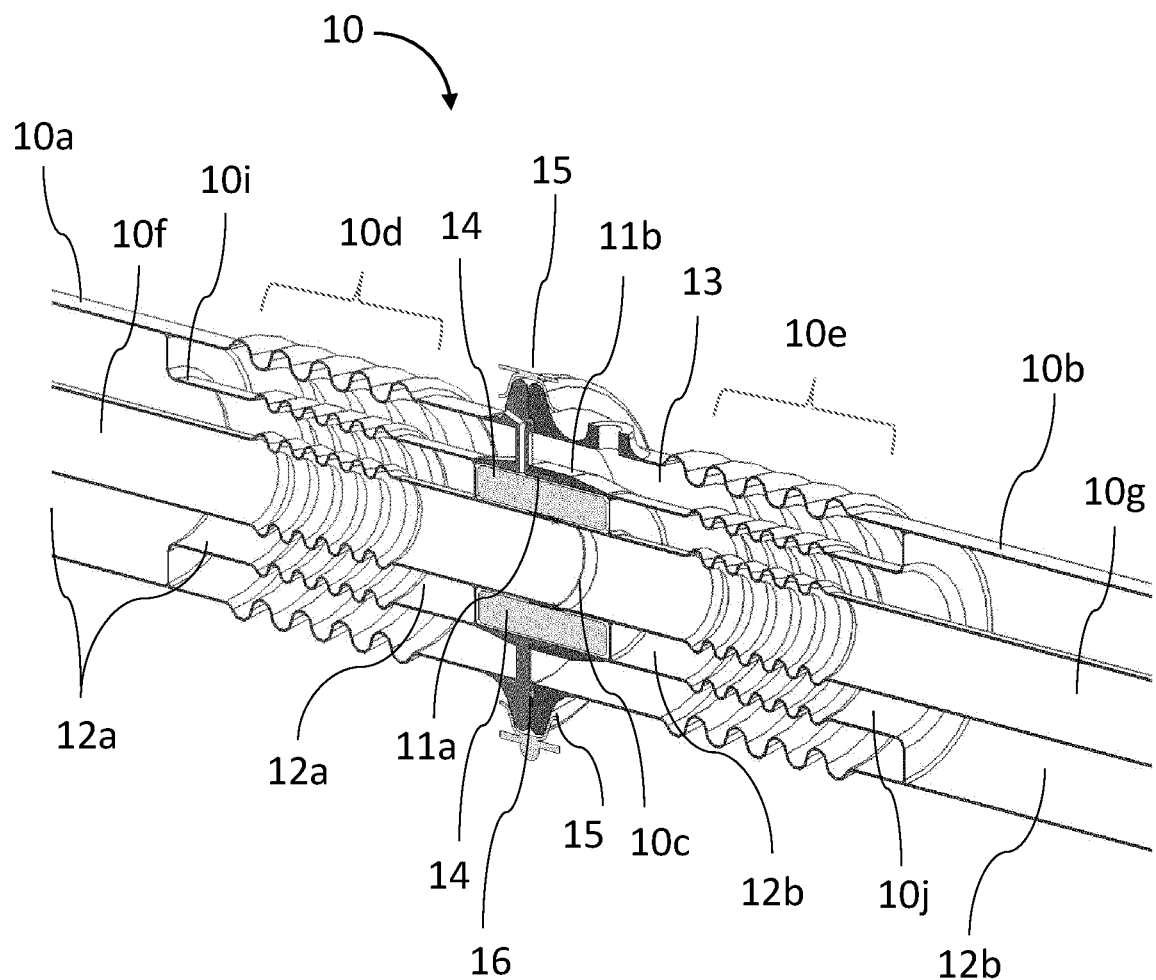
FIG. 2 is a vertical cross section perspective view of the connection between two portions of a line, as shown in FIG. 1.

FIG. 2 is a vertical cross section of the connection assembly 10 of two line portions 10a and 10b. The vertical cutting plane contains the longitudinal axis of the vacuum opening 13a. The perspective cross section view in FIG. 2 shows details of the connection assembly 10 of two line portions 10a and 10b. The line portion 10a includes an inner tube 10f intended to contain the liquid hydrogen to be distributed using the line. The inner tube 10f is concentric with the overall tubular outer wall of the line portion 10a. The line portion 10b includes an inner tube 10g intended to contain the liquid hydrogen to be distributed, that is provided and configured to ensure continuity of distribution with the inner tube 10f of the line portion 10a. The inner tube 10g of the line portion 10b is concentric with the overall tubular outer wall of the line portion 10b. The term "overall tubular wall" refers herein to a line wall having a general tubular shape, which may nonetheless include corrugations over certain lengths to provide a degree of flexibility. The diameter of the end of the inner tube 10f positioned on the side of the line portion 10a intended to be connected to the line portion 10b is slightly less than the diameter of the end of the inner tube 10g positioned on the side of the line portion 10b intended to be connected to the line portion 10a. Thus, during assembly of the connection between the line portions 10a and 10b, the end of the inner tube 10f is inserted into the end of the inner tube 10g. In other words, the end of the inner tube 10f is a male nozzle that is inserted into the end of the inner tube 10g. The ends of the inner tubes 10f and 10g together form a sealed tight sliding link. To do so, the coefficient of expansion of the material used to make the inner tube 10f is much lower than the coefficient of expansion of the material used to make the inner tube 10g. According to one embodiment of the invention, the material used to make the inner tube 10f is invar and the material used to make the inner tube 10g is stainless steel. Advantageously, when the liquid hydrogen is inside the inner tubes 10f and 10g of the line portions 10a and 10b, the very low temperature of the liquid hydrogen contracts the end of the tube 10g on the end of the tube 10f and reinforces the tight sliding link to obtain a sealed tight link with no play. The contact surfaces 10c between the two ends of the inner tubes 10f and 10g are pressed against one another with significant mechanical force, since the invar hardly contracts at all with the cold and the stainless steel of the female end contracts significantly on the male end, as a result of the difference between the thermal coefficients of expansion of the two materials used.

Furthermore, a male nozzle 11a is arranged in the extension of the thermal insulation chamber 12a of the portion 10a of the connection assembly 10, and a female nozzle 11b is arranged in the extension of the thermal insulation chamber 12b of the portion 10b of the connection assembly 10. These two nozzles 11a and 11b cooperate like the ends of the inner tubes 10f and 10g, i.e., the male nozzle 11a is made of a material with a coefficient of expansion considerably lower than the material used to make the female nozzle 11b, so that the female nozzle 11b contracts onto the male nozzle 11a to create a sealed tight link when there is a cryogenic liquid such as liquid hydrogen inside the line. According to one embodiment of the invention, the line portion 10a is made of invar and the line portion 10b is made of stainless steel. Advantageously, any line portion joining two neighboring connection assemblies together comprises two elements that are rigidly connected together, one of which is made of invar and the other of stainless steel, so that the cold contraction principle applied to obtain a sealed tight mechanical link can be used for several successive connection assemblies on a given line.

An intermediate partition 10i extends between the outer wall of the line portion 10a and the inner tube 10f of the line portion 10a, delimiting the thermal insulation chamber 12a between the inner tube and the outer wall of the line portion 10a, on the side of the line portion 10a with the connection assembly 10. Similarly, an intermediate partition 10j extends between the outer wall of the portion 10b and the inner tube 10g of the line portion 10b, delimiting a thermal insulation chamber 12b between the inner tube and the outer wall of the line portion 10b, on the side of the line portion 10b with the connection assembly 10. Each line portion, for example the portions 10a and 10b, has an intermediate inner partition at each end, close to the connection assembly, where necessary. The two partitions 10i and 10j of each of the line portions delimit an additional thermal insulation chamber 13 between the liquid-hydrogen supply inner tube and the outer wall, the outer surface of which is in contact with the environment immediately outside the distribution line. According to one embodiment, the end of the outer wall of each of the line portions 10a and 10b is flared to form a terminal contact flange that is arranged to be positioned opposite the terminal contact flange of the other line portion of the line portions 10a and 10b. The terminal contact flanges are arranged to be surrounded by a strap or a collar 15 to hold the connection between the two line portions 10a and 10b. At least one of the terminal contact flanges has a groove to receive a ring gasket 16 that is compatible with the very low temperatures of a cryogenic fluid such as liquid hydrogen. Cleverly, a cryogenic fluid expansion chamber 14 is arranged on each side of the contact surfaces between the male and female nozzles respectively disposed at the end of the inner tubes 10f and 10g, and an additional thermal insulation chamber 13 is arranged between the intermediate inner partitions 10i and 10j and the outer walls of the portions 10a and 10b such as to thermally insulate the line portion including the cryogenic fluid expansion chamber 14. A duct 14a (shown in FIG. 3) is arranged between the expansion chamber 14 and the outside of the line. According to one embodiment, the opening of the duct 14a that leads to the outside of the line comprises a housing for fastening a hydrogen sensor 14b for detecting the presence of hydrogen. In the example described, the opening of the duct 14a is configured for the housing or to fasten the sensor 14b configured to detect the presence of liquid hydrogen in the expansion chamber 14. Such a housing enables a hydrogen detection sensor to be assembled so that some or all of the sensor is inserted into the line and is able to detect hydrogen coming from the expansion chamber 14. In one example, the outer wall of the line is machined and threaded to enable assembly of a liquid or gas hydrogen detection sensor. According to one embodiment, the assembly is advantageously a "gas assembly" to prevent any hydrogen leaks to the outside of the line. A duct 14a links the expansion chamber 14 and the housing provided for assembly of a hydrogen detection sensor. Advantageously, the housing is a terminal volume of the duct 14a linking the expansion chamber to the outside of the line (with no sensor). The presence of liquid hydrogen in the expansion chamber 14 of the hydrogen line indicates a leak in the connection of the inner tubes 10f and 10g, which is potentially detrimental to the correct operation of the systems and/or to safety. Advantageously, the ability to quickly detect a liquid hydrogen leak in the joint between the male and female nozzles of the inner tubes 10f and 10g using a hydrogen detection sensor enables immediate action to be taken on the hydrogen supply in the line. This, for example, makes it possible to order the closure of a valve positioned on the line upstream of the connection assembly 10 to limit the quantity of fluid distributed through the line, and consequently the quantity of fluid that could leak from the inner tube if there is a leak in the connection between the inner tubes 10f and 10g in the line.

According to one embodiment, the fluid expansion chamber 14 contains an absorbent element 17 (shown in FIG. 3) that is made of an absorbent material, preferably a spongy material, to act as a buffer and to keep the fluid in the expansion chamber.

According to a variant of the embodiment, a hydrogen detection sensor 14c is inserted directly into the expansion chamber 14, and the housing arranged at the outlet of the duct 14a linking the expansion chamber with the outside of the line is then configured to receive electrical connection means for the sensor (electrical power supply to the sensor and signal from the sensor) or to pass cables through a sealed shutter.

Figure 3:
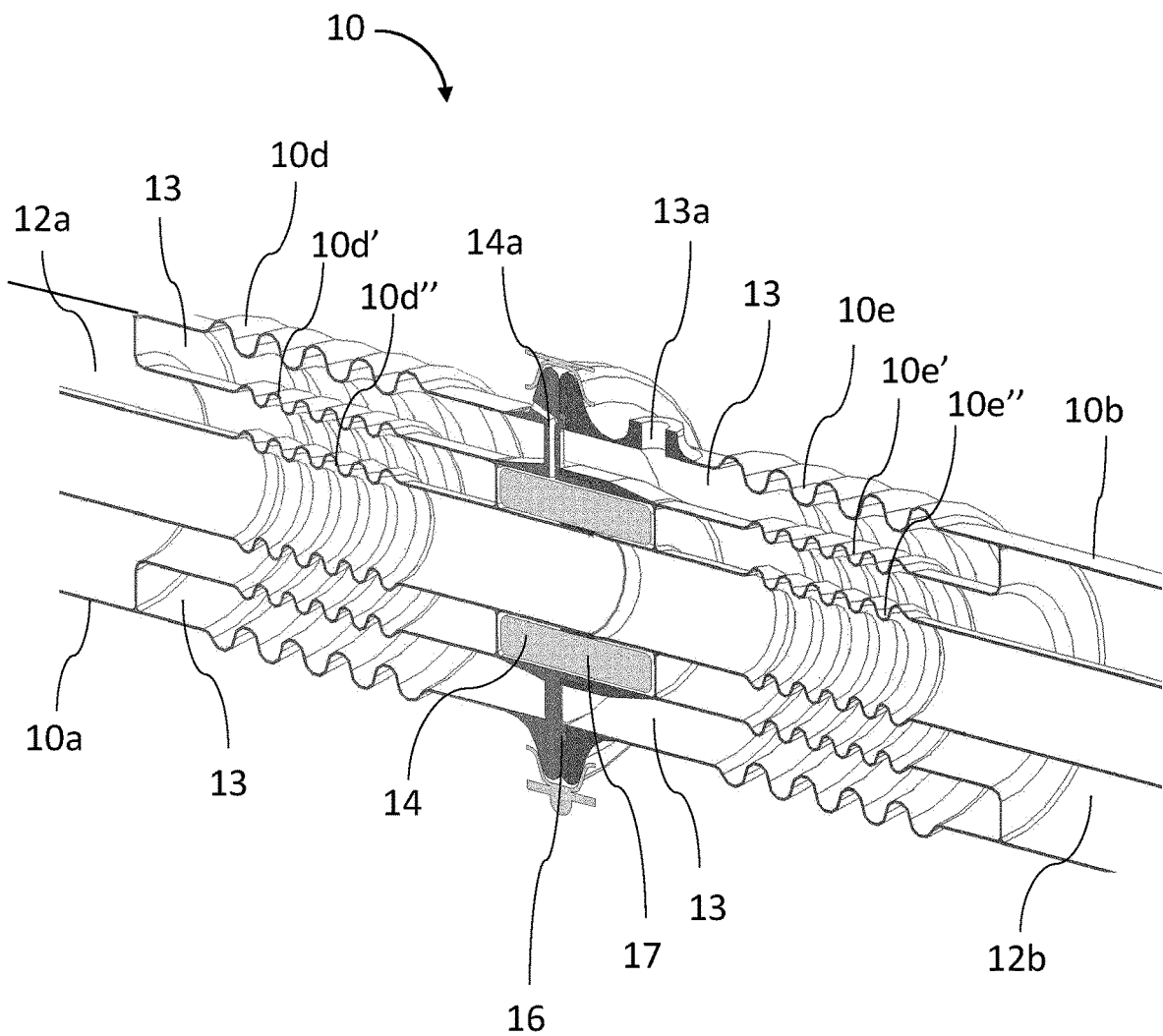
FIG. 3 is a vertical cross section perspective view of the details of the connection between two portions of a line, as shown in FIGS. 1 and 2.

FIG. 3 shows in detail the corrugations 10d' and 10d" respectively arranged on the intermediate inner wall 10i, and on the inner tube 10f of the line portion 10a, as well as the detail of corrugations 10e' and 10e" respectively arranged on the intermediate inner wall 10j and on the inner tube 10g of the line portion 10b. The corrugations 10d, 10d' and 10d"

extend over shared lengths of each of the walls of the line portion 10a (outer, intermediate inner, and inner) providing greater flexibility in the line portion 10a than with a bayonet fitting found in the prior art. The same is true of the corrugations 10e, 10e' and 10e" that extend over shared lengths of each of the walls of the line portion 10b (outer, intermediate inner, and inner) providing greater flexibility in the line portion 10b than with a bayonet fitting found in the prior art.

Figure 4:
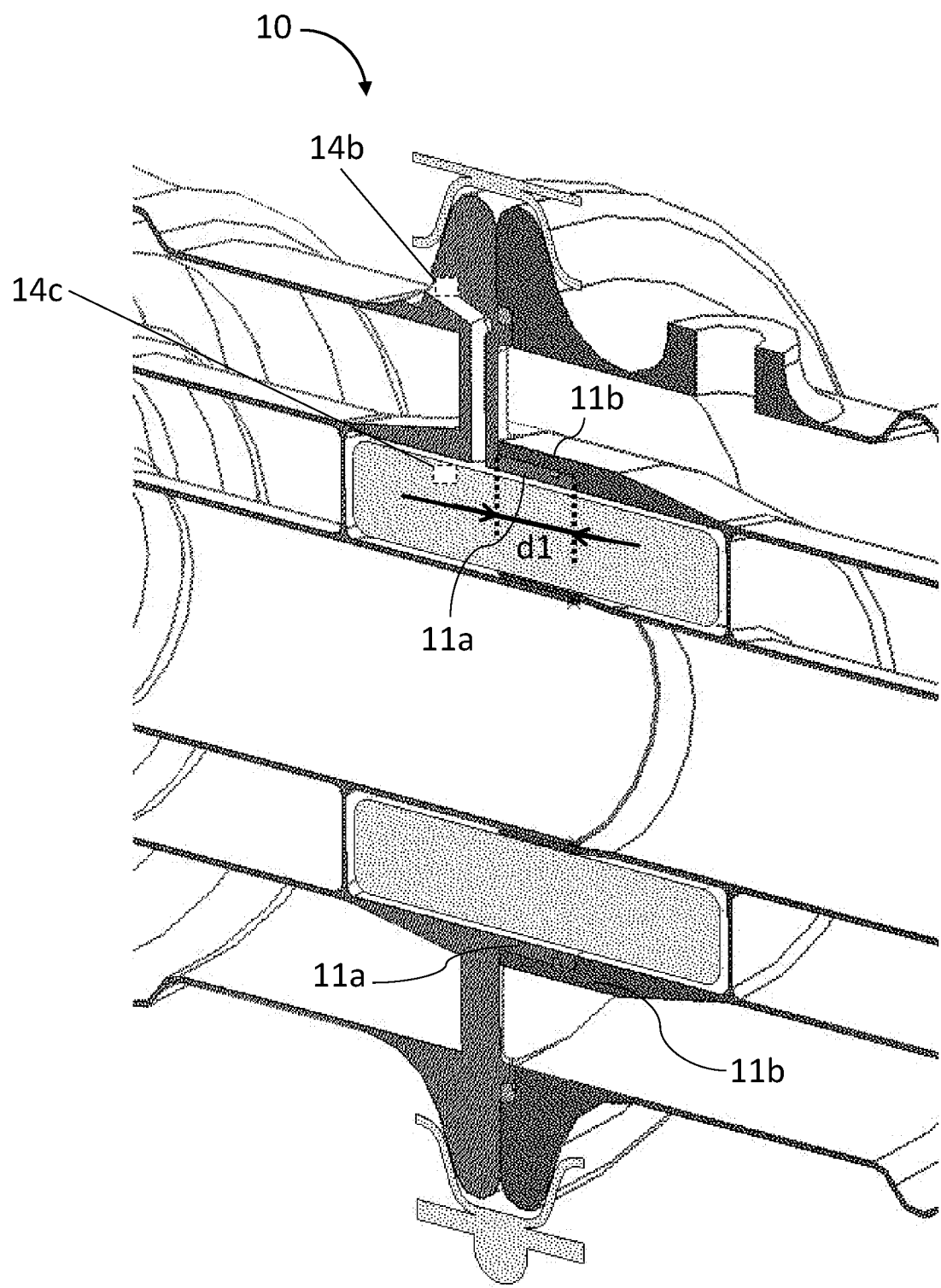
FIG. 4 is a vertical cross section perspective view showing a maximum insertion distance of the male nozzle into the female nozzle of the connection between two portions of a line, as shown in FIGS. 1, 2 and 3.

FIG. 4 shows a maximum insertion distance d1 of the male nozzle 11a into the female nozzle 11b inherent in the structure of these nozzles and more generally in the structure of the line portions 10a and 10b. Advantageously, on account of the use of an expansion chamber to contain and detect leaks, this maximum insertion distance d1 of the male nozzle 11a into the female nozzle 11b can be equal to or less than 50 mm, and preferably equal to or less than 20 mm. Indeed, although the risk of leaks occurring is greater if the insertion distance of the tight sliding link is shorter than with a bayonet fitting, leaks can be detected immediately by a sensor housed in the end of the duct 14a and appropriate action can be taken without delay to deal with the leak. For example, a valve in the line can be closed and the liquid hydrogen can be supplied via another line in the hydrogen distribution system.

Figure 5:
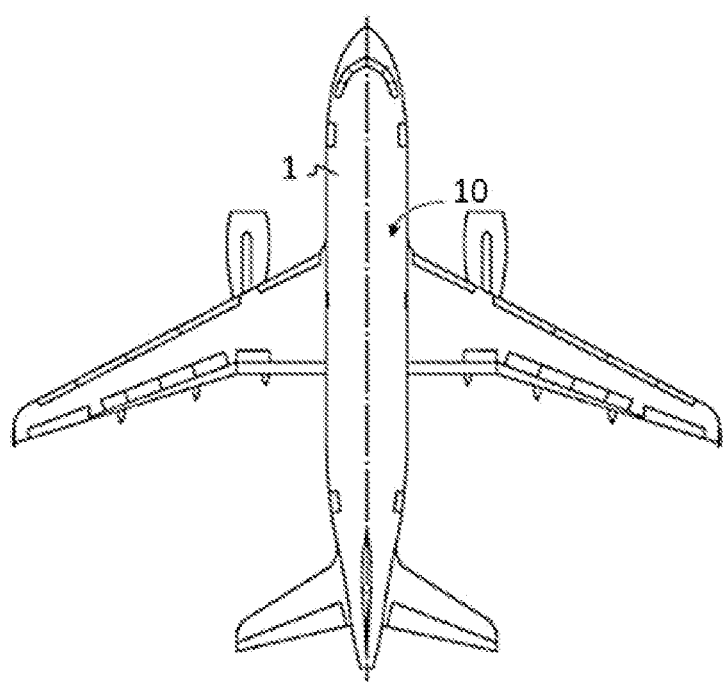
FIG. 5 is a top view of an aircraft including a connection assembly between two portions of a line, as shown in FIGS. 1 to 4.

FIG. 5 shows an aircraft 1 including a hydrogen cell and a liquid hydrogen distribution system including the connection assembly 10 as well as other connection assemblies similar to the connection assembly 10. Advantageously, the use of such connection assemblies, similar to the connection assembly 10, enables the installation of a liquid hydrogen distribution system between a hydrogen storage tank and the fuel cell of the aircraft 1, including in tight spaces, since the connection assemblies are flexible and the assembly and disassembly thereof does not require a lot of free space about each of the connection assemblies. This is particularly advantageous on board an aircraft.

The invention is not limited to the embodiments and examples described, but more broadly concerns any connection assembly between two portions of a line for supplying a cryogenic fluid, including a male nozzle arranged to be at least partially inserted in a female nozzle to together form a tight mechanical link, over a distance equal to or less than 5 cm, a thermal insulation chamber for each of the two line portions and an additional thermal insulation chamber to thermally insulate the connection zone of the two line portions, as well as an expansion chamber for the supplied cryogenic fluid that is configured to be linked to a cryogenic fluid sensor in the fluid expansion chamber, arranged about the connection zone of the two line portions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection assembly between two portions of a supply line for a cryogenic fluid, the connection assembly comprising:
   a first line portion,
   a second line portion,
      the first line portion including a male nozzle arranged to be at least partially inserted into a female nozzle of the second line portion, said male and female nozzles together forming a tight sliding mechanical link,
      the first line portion being made of a first material with a coefficient of expansion lower than the coefficient of expansion of a second material used to make the second line portion,
      the first line portion including a first thermal insulation chamber and the second line portion including a second thermal insulation chamber,
   at least one additional thermal insulation chamber that is separate from each of the first and second thermal insulation chambers and that extends between the first and second thermal insulation chambers, and
   an expansion chamber for said fluid arranged around and exterior to contact surfaces between the first line portion and the second line portion where said male nozzle is at least partially inserted into said female nozzle, the expansion chamber being disposed between the first thermal insulation chamber and the second thermal insulation chamber and being linked via a duct to a sensor which detects the presence of said cryogenic fluid located within the duct or within the expansion chamber.

2. The connection assembly according to claim 1, wherein said expansion chamber has an absorbent element configured to absorb said fluid.

3. The connection assembly according to claim 1, wherein at least one of the first line portion and the second line portion is generally cylindrical and has inner and outer walls with corrugations, the corrugations of the inner wall extending over a length of line with corrugations on the outer wall.

4. The connection assembly according to claim 1, wherein the first material is invar and the second material is stainless steel.

5. The connection assembly according to claim 1, wherein a vacuum is created in each of said at least one additional thermal insulation chambers.

6. The connection assembly according to claim 5, wherein a vacuum opening enables said vacuum to be created in said at least one additional thermal insulation chamber.

7. The connection assembly according to claim 1, wherein a maximum insertion distance of the male nozzle into the female nozzle is equal to or less than 50 mm.

8. The connection assembly according to claim 7, wherein the maximum insertion distance of the male nozzle into the female nozzle is equal to or less than 20 mm.

9. The connection assembly according to claim 1, wherein said sensor is located within a terminal volume of the duct linking said expansion chamber to the outside of the supply line.

10. The connection assembly according to claim 1,
    wherein an end of an outer wall of each of the first and second line portions is flared to form a terminal contact flange that is configured to be positioned opposite the terminal contact flange of the other line portion of the line portions, and
    wherein said sensor is arranged at a base of one of the terminal flanges.

11. A liquid hydrogen distribution system including a connection assembly according to claim 1.

12. An aircraft including a distribution system according to claim 11.

13. An aircraft including a connection assembly according to claim 1.

14. The connection assembly according to claim 1, wherein said sensor is located within the expansion chamber.

* * * * *